United States Patent [19]
Wight et al.

[11] Patent Number: 5,148,113
[45] Date of Patent: Sep. 15, 1992

[54] CLOCK PHASE ALIGNMENT

[75] Inventors: Mark S. Wight, Ottawa; Valerie A. Van Alstine, Nepean; Gwendolyn K. Harris, Ottawa, all of Canada

[73] Assignee: Northern Telecom Ltd., Quebec, Canada

[21] Appl. No.: 620,884

[22] Filed: Nov. 29, 1990

[51] Int. Cl.[5] .............................. H03K 5/13
[52] U.S. Cl. ..................... 328/155; 328/133
[58] Field of Search ............: 307/511, 525, 527, 605; 328/55, 155, 133, 134

[56] References Cited

U.S. PATENT DOCUMENTS

| | | | |
|---|---|---|---|
| 4,190,807 | 2/1980 | Weber | 328/155 |
| 4,450,410 | 5/1984 | Kliger | 328/155 |
| 4,577,163 | 3/1986 | Culp | 328/155 |
| 4,878,231 | 10/1989 | Cok | 328/133 |
| 4,881,243 | 11/1989 | Whitt | 328/155 |
| 4,901,026 | 2/1990 | Phillips | 328/133 |
| 4,902,920 | 2/1990 | Wolaver | 328/155 |
| 4,926,140 | 5/1990 | Schenberg | 328/134 |

Primary Examiner—Eugene R. LaRoche
Assistant Examiner—A. Zarabian
Attorney, Agent, or Firm—Wenderoth, Lind & Ponack

[57] ABSTRACT

A phase error integrator for determining the phase error between a data signal and a clock signal frequency locked to the data signal has a data input and a clock input. In one embodiment the phase error integrator is formed as two functional components, namely a phase error detector and an integrator chain. The phase error detector sends to the integrator one of two output signals depending on whether the phase error is positive or negative. The integrator chain has a number of outputs the first half of which initially have a binary 1 and the second half of which initially have a binary 0. Depending on which output signal arrives from the phase error detector the binary 1's shift right or the binary 0's shift left. The integrator may be combined with a delay block connected to the outputs of the integrator chain. The data signal is fed to the delay block and delayed data output signal is obtained which is connected to the data input of the phase error integrator. The delay block delays the data signal until there is concordance between the phase of the clock and delayed data signals.

10 Claims, 13 Drawing Sheets

CLOCK PHASE ALIGNMENT

BACKGROUND OF THE INVENTION

This invention relates to a circuit for determining the phase error between a data stream and a clock signal and, more particularly, to such a circuit in which the data stream is phase aligned with the clock signal and reclocked.

SUMMARY OF THE INVENTION

According to one aspect, the invention provides a phase error integrator for determining the phase error between a data signal and a clock signal frequency locked to the data signal comprising a data input and a clock input, means for comparing the phase of a data signal applied to the data input with a clock signal applied to the clock input and deriving at N outputs a digital phase error output signal which at any point in time comprises a chain of N digits made up of M digits of a first binary sense (i.e. 1 or 0) followed by P digits of a second binary sense where M plus P equals N, the chain shifting the first binary sense digits right when the error between the data signal and the clock signal is in one sense (i.e. positive or negative) and the chain shifting the second binary sense digits left when the error is in the opposite sense.

According to another aspect, the phase error integrator may be combined with a delay block to form a phase alignment circuit for aligning the data signal with the clock signal. The delay block has a plurality of inputs connected respectively to at least some of the N outputs of the phase error integrator, an input for receiving data and an output at which is provided a delayed data signal, the output being connected to the data input of the phase error integrator, the delay block delaying the data signal until there is concordance between the phase of the clock and delayed data signals.

DESCRIPTION OF PREFERRED EMBODIMENTS

Figure 1:
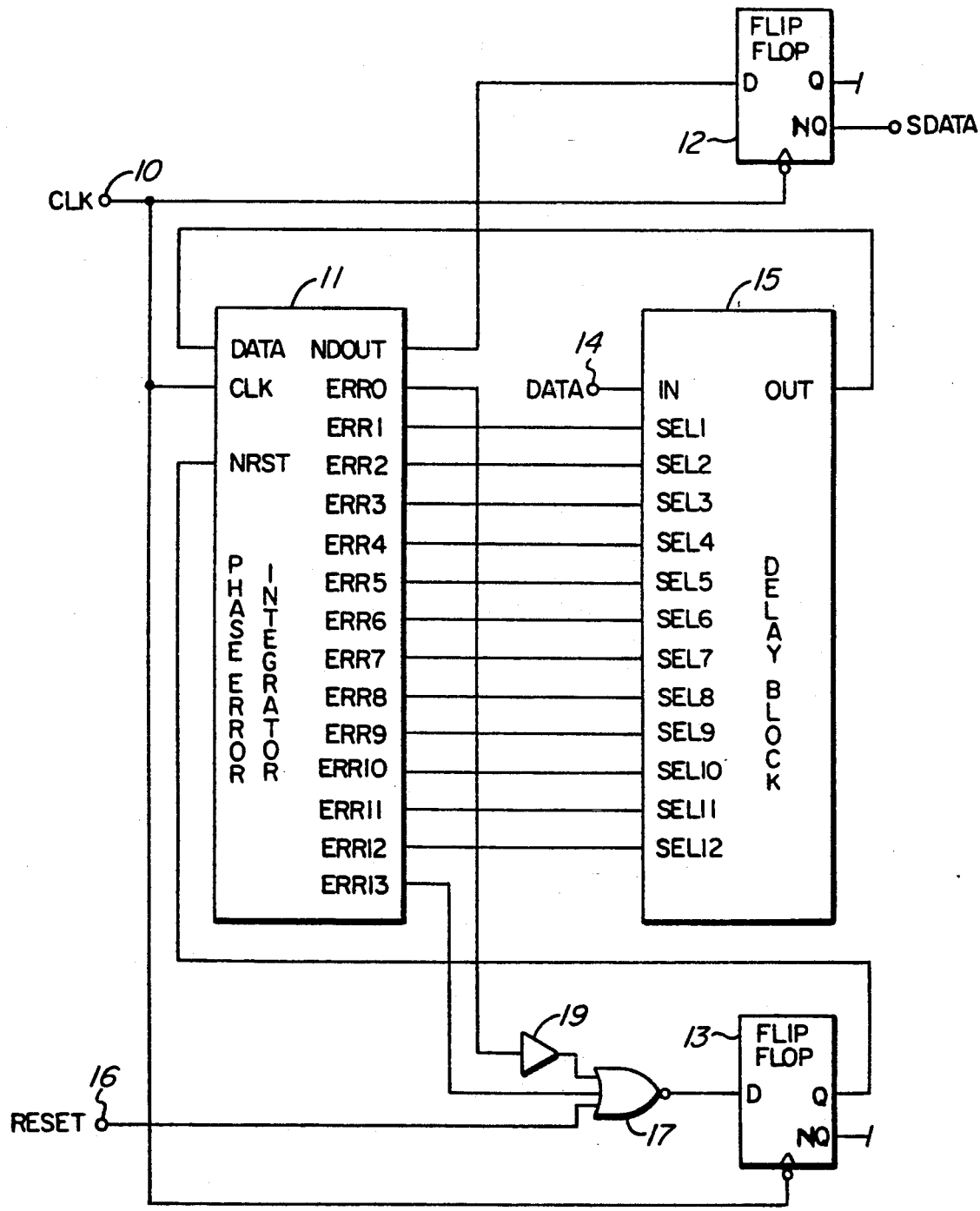
FIG. 1 is a block diagram showing a clock data phase alignment circuit according to the invention.

The architecture of the circuit is shown in FIG. 1. The input signals to this circuit are clock (CLK), DATA and RESET. The CLK signal is a 50% duty cycle clock frequency locked to the DATA signal. The DATA signal is an NRZ signal which has indeterminate phase with respect to the CLK signal. The RESET signal is an asynchronous reset used for test purposes.

The CLK signal is applied at terminal 10 which is connected by means of conductor lines to the CLK input of a phase error integrator block (PEI) 11 and to the CLK inputs of edge-triggered flip-flops 12 and 13.

The DATA signal is applied at terminal 14 which is connected to the IN input of a delay block 15.

The RESET signal is applied at terminal 16 which is connected to a first input of a NOR gate 17.

Considering PEI 11 more particularly, it has a DATA input connected to an OUT output of delay block 15 and an NRST input connected to the Q output of flip-flop 13. The outputs of PEI 11 are NDOUT, which is connected to the D input of flip-flop 12, and error outputs ERR0 to ERR13. ERR0 is connected through an inverter 19 to a second input of gate 17 and ERR13 is connected directly to a third input of gate 17. ERR1 to ERR12 inclusive are connected respectively to inputs SEL1 to SEL12 of delay 15.

In operation the delay blcok 15 delays the DATA signal under control of PEI 11. More particularly, PEI 11 compares the phase of the CLK signal with the delayed DATA signal. The further error outputs ERR0 to ERR13, which are initially set to 11111110000000, are incremented for negative phase errors and decremented for positive phase errors. The delay achieved by delay block 15 is varied appropriately until there is concordance between the phase of the CLK and delayed DATA signals. The delayed DATA signal is applied from NDOUT to flip-flop 12 where it is reclocked with the negative edge of the clock centred in the data eye, the reclocked DATA signal appearing as SDATA at the NQ output of flip-flop 12.

Figure 2:
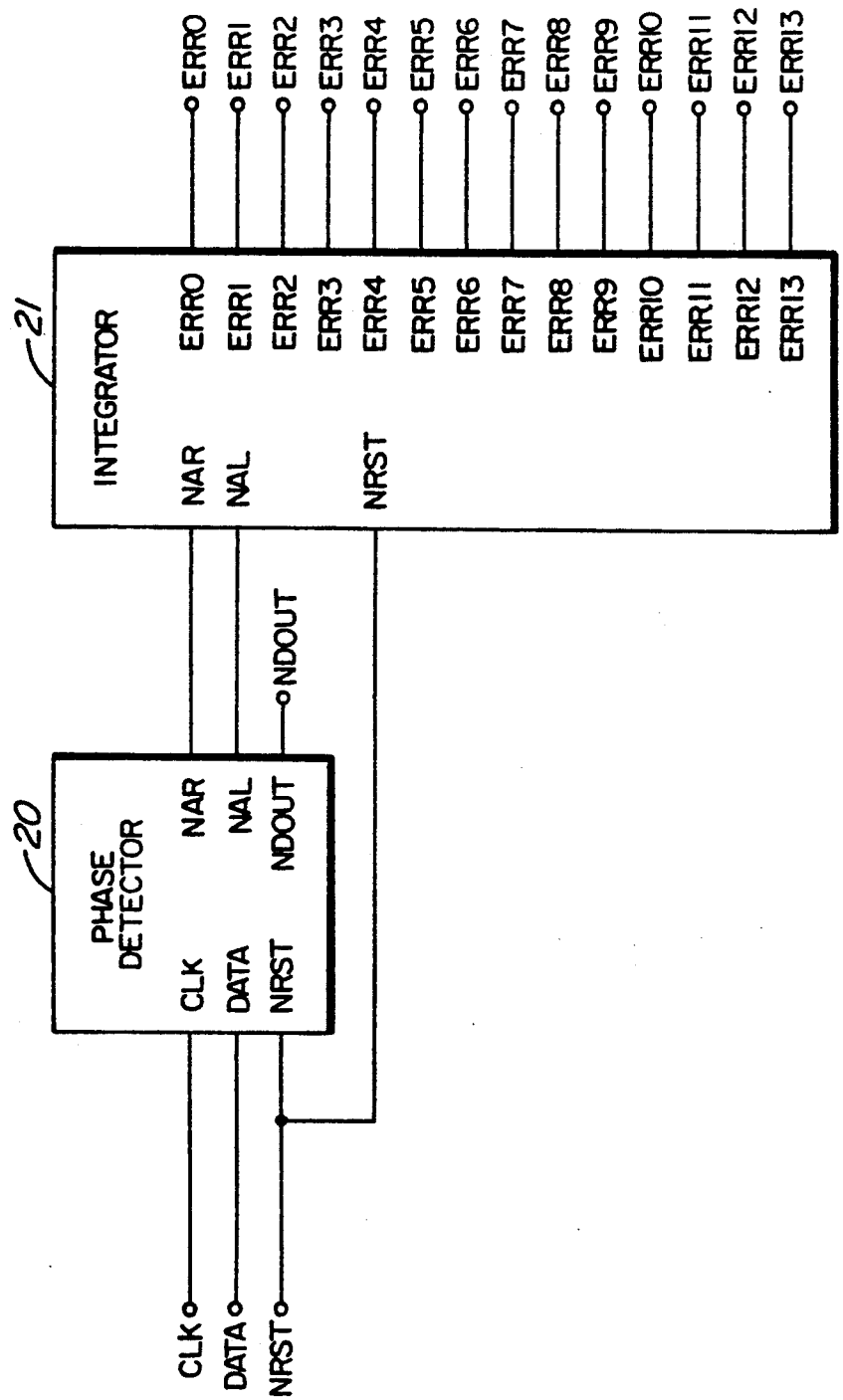
FIG. 2 is a block diagram showing a phase error integrator used in the circuit of FIG. 1.

The phase error integrator can be divided into two functional blocks, a phase detector 20 and an integrating chain 21 as shown in FIG. 2.

The phase detector 20 uses the CLK signal and the delayed DATA signal from the delay block 15 to generate positive and negative error output signals NAR and NAL which control the integrating chain 21. NDOUT is also output from phase detector 20, NDOUT being the inverted DATA input to detector 20 delayed and centred between the positive and negative phase error output signals NAR and NAL.

The integrating chain 21 consists of N (fourteen in the example shown, namely ERR0 to ERR 13) segments corresponding to the number of digits in the phase error output. At a single point in time the output of the chain will be M '1's followed by P '0's where M plus P equals N. A negative error input causes the chain to shift '1's right where M goes to M plus one. A positive error input causes the chain to shift '0's left where M goes to M minus one.

Figure 3:
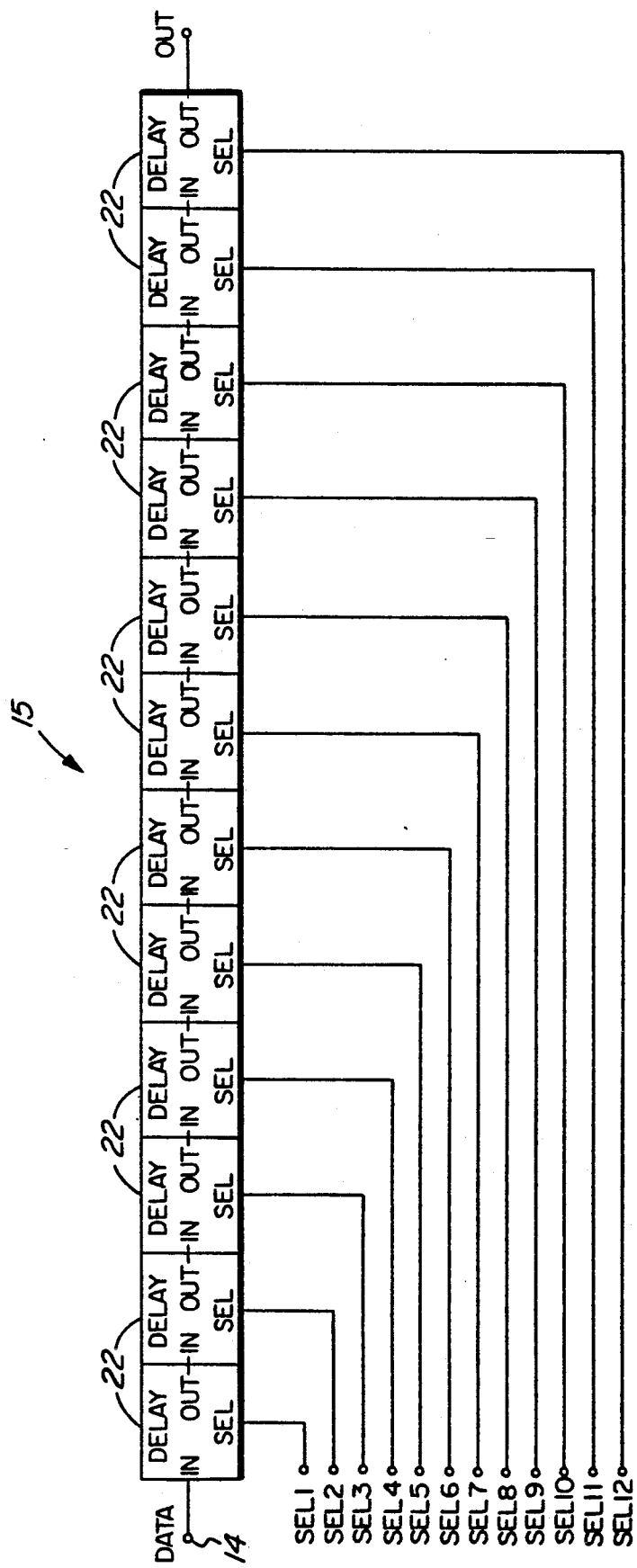
FIG. 3 is a block diagram showing a delay block of FIG. 1 in more detail.

The delay block 15 is structured as a chain of delay elements 22 as shown in FIG. 3. Each delay element 22 has a data input IN, a control input SEL and a delayed data output OUT. The IN input of the first element 22 in the chain is connected to the DATA terminal 14 and the OUT output of the last element 22 in the chain is the OUT output of the entire delay block. The control inputs SEL are respectively connected to inputs SEL1 to SEL12. If the control input is '1' the data is routed through the maximum delay path of a delay element 22 as described below in more detail. If the control input is '0' the data is routed through a minimum delay path of the delay element.

If the phase error integrator overflows or underflows, the flip-flop 13 (FIG. 1) detects this and reinitializes the phase error integrator to a midpoint setting. More particularly an overflow condition exists when there is '1' on ERR13 and an underflow condition exists when there is '0' on ERR0. If either of these conditions exists then a '1' exists at one of the inputs of gate 17 giving rise to a '0' at the output of gate 17. This resets the Q output of flip-flop 13 to '0' and consequently the NRST input of PEI 11 is reset to '0' which initializes ERR0 to ERR13 as '1111111000000'. The phase error integrator will then align with and track the data. A delay range of 360 degrees plus is required on either side of the midpoint setting to assure lock.

The structure and operation of the circuitry will now be described in more detail with reference firstly to FIG. 4 which shows an implementation of the phase detector block 20.

Figure 4:
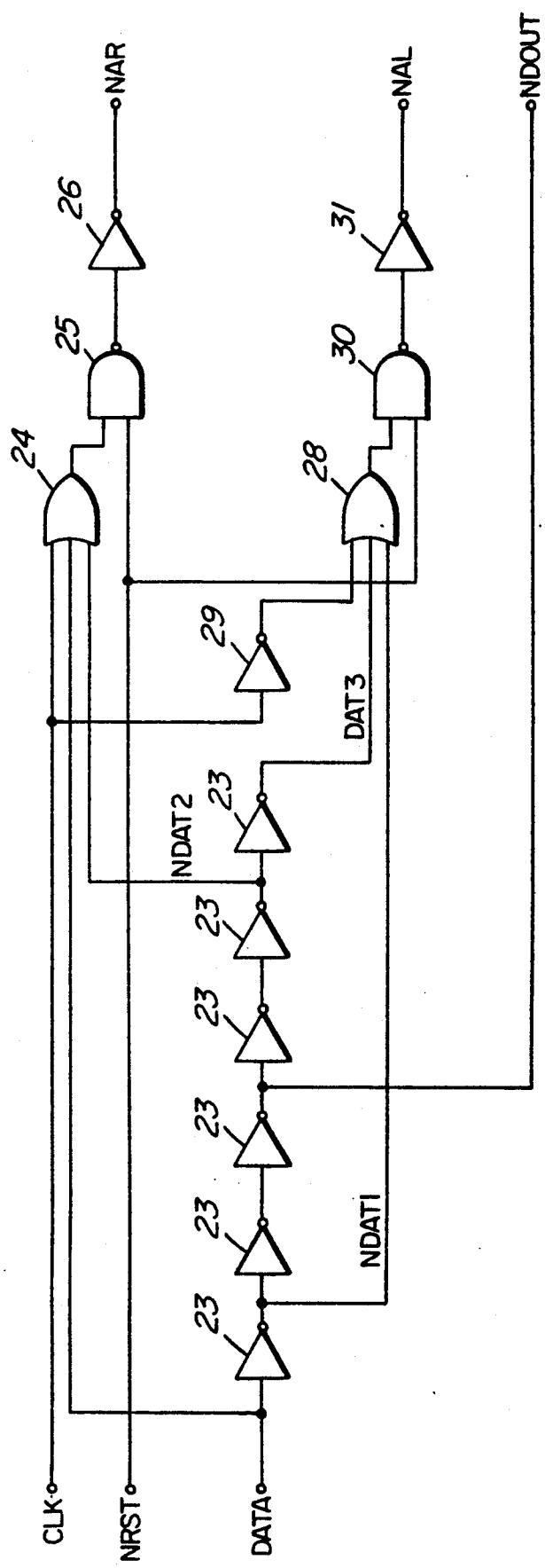
FIG. 4 shows the logic circuitry making up a phase detector of FIG. 2.

As seen in FIG. 4, the DATA input of the phase detector 20 to which the delayed data from delay block 15 is sent is connected to the first of a series of six inverters 23. The output of the first inverter is denoted NDAT1, the output of the third inverter is connected to the NDOUT output of the phase detector 20, the output of the fifth inverter is denoted NDAT2 and the output of the sixth inverter is denoted DAT3.

The CLK input and the DATA input of the phase detector 20 and the NDAT2 output are all connected to respective inputs of an OR gate 24 the output of which is connected to an input of a NAND gate 25 the output of which is connected through an inverter 26 to a terminal labelled NAR. Another input of NAND gate 25 is connected to NRST input of the phase detector 20.

The NDAT1 and DAT3 outputs are connected to respective inputs of an OR gate 28. Another input of OR gate 28 is connected through an inverter 29 to the CLK input of phase detector 20. The output of OR gate 28 is connected to an input of a NAND gate 30 another input of which is connected to the NRST input. The output of NAND gate 30 is connected through an inverter 31 to a terminal labelled NAL.

Figure 5:
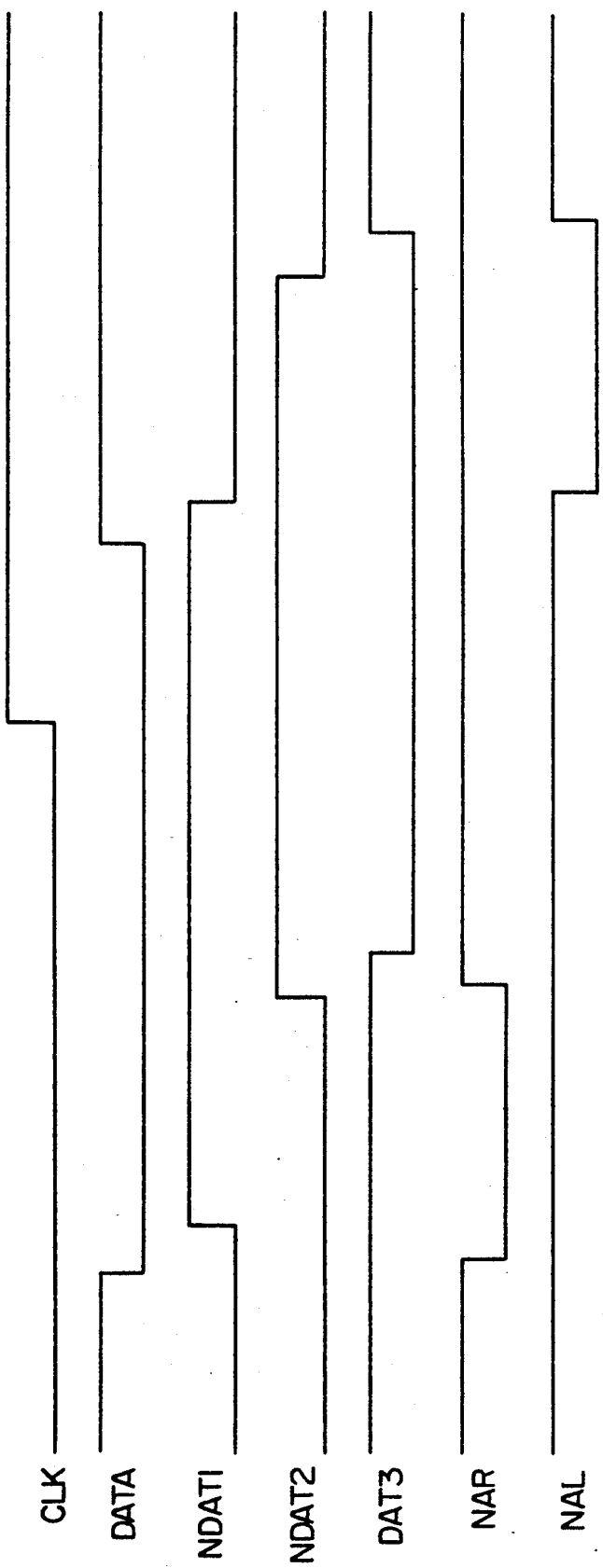
FIG. 5 shows the waveforms obtained at different points of FIG. 4.

With reference to FIG. 5 in conjunction with FIG. 4, the logical operation of components 24, 25 and 26 is as follows. The signal NDAT2 is a delayed and inverted version of the signal DATA. The signals DATA and NDAT2 are both low for a short period of time following the falling edge of DATA. If the falling edge of DATA occurs during the half of the clock period when the CLK signal is low a negative phase error is detected and the signal NAR is pulsed low.

The logical operation of components 28, 29 and 30 is now described. The signal NDAT1 is a delayed and inverted version of the signal DATA. The signal DAT3 is a delayed and inverted version of the signal NDAT1. The signals NDAT1 and DAT3 are both low for a short period of time following the rising edge of DATA. If the rising edge of DATA occurs during the half of the clock period when the CLK signal is high a positive phase error is detected and the signal NAL is pulsed low.

Figure 6:
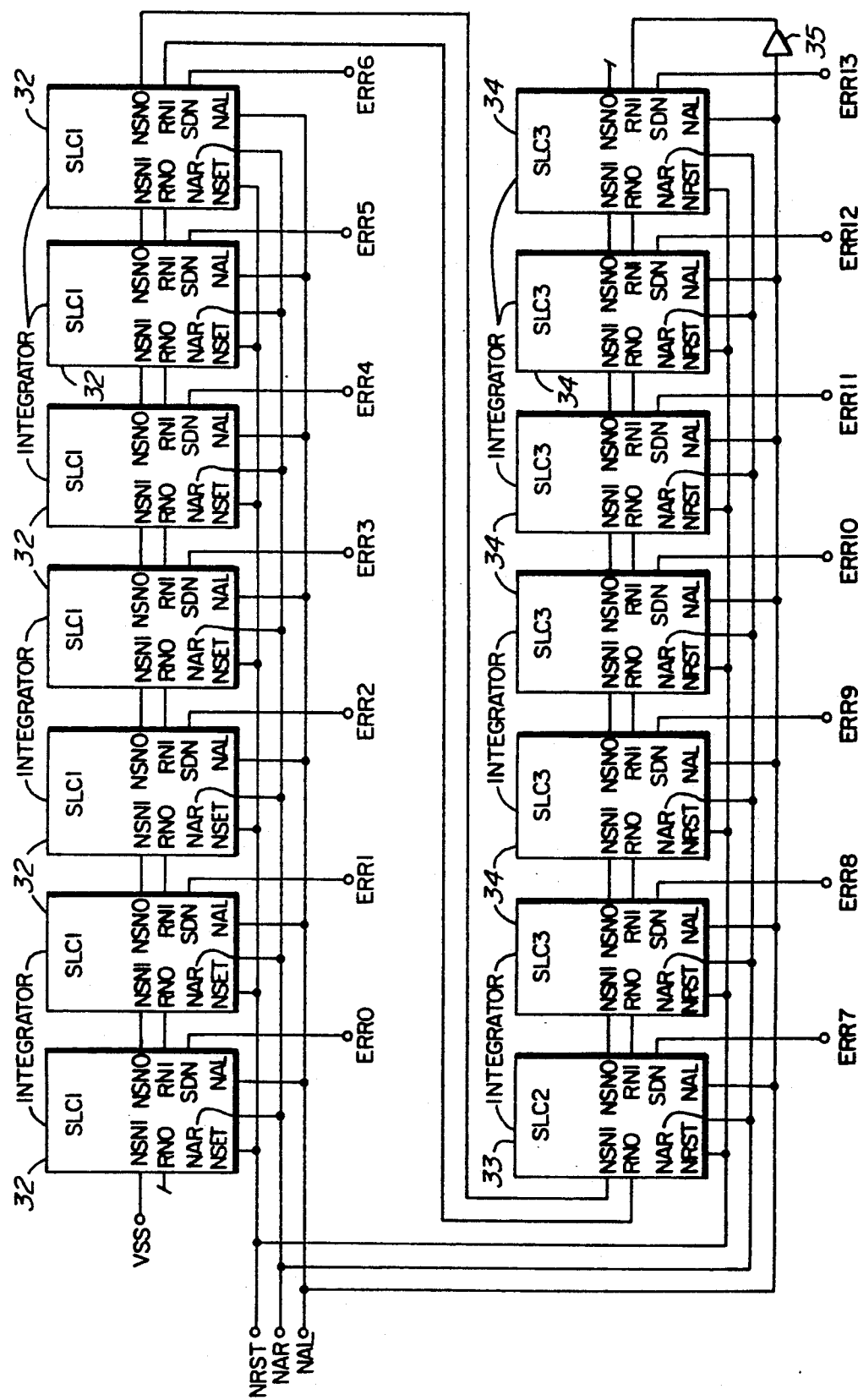
FIG. 6 is a block diagram showing an integrator of FIG. 2 in more detail.

An implementation of the integrating chain 21 is shown in FIG. 6. The circuit is divided into seven SLC1 blocks 32 followed by one SLC2 block 33 followed by six SLC3 blocks 34. The three types of SLC blocks are identical except for their asynchronous reset logic. The SDN output of each SLC block is a single digit of the integrated phase error ERR0 to ERR13. As indicated previously, when ERR0 is reset to '0' this indicates an underflow and when ERR13 is set to '1' this indicates an overflow. The inverted phase error output (NSNO) of each block 32, 33 or 34 is connected to the NSNI input of the next block. The RNO output of each block is connected to the RNI input of the previous block. The RNO signal is active during the shift left sequence. The NSNI input of the first block 32 is connected to a supply voltage VSS and the RNO input of the first block is disconnected. The NSNO input of the last block 34 is disconnected and the RNI input of the last block is connected through an inverter 35 to the NAL bus.

Figure 7:
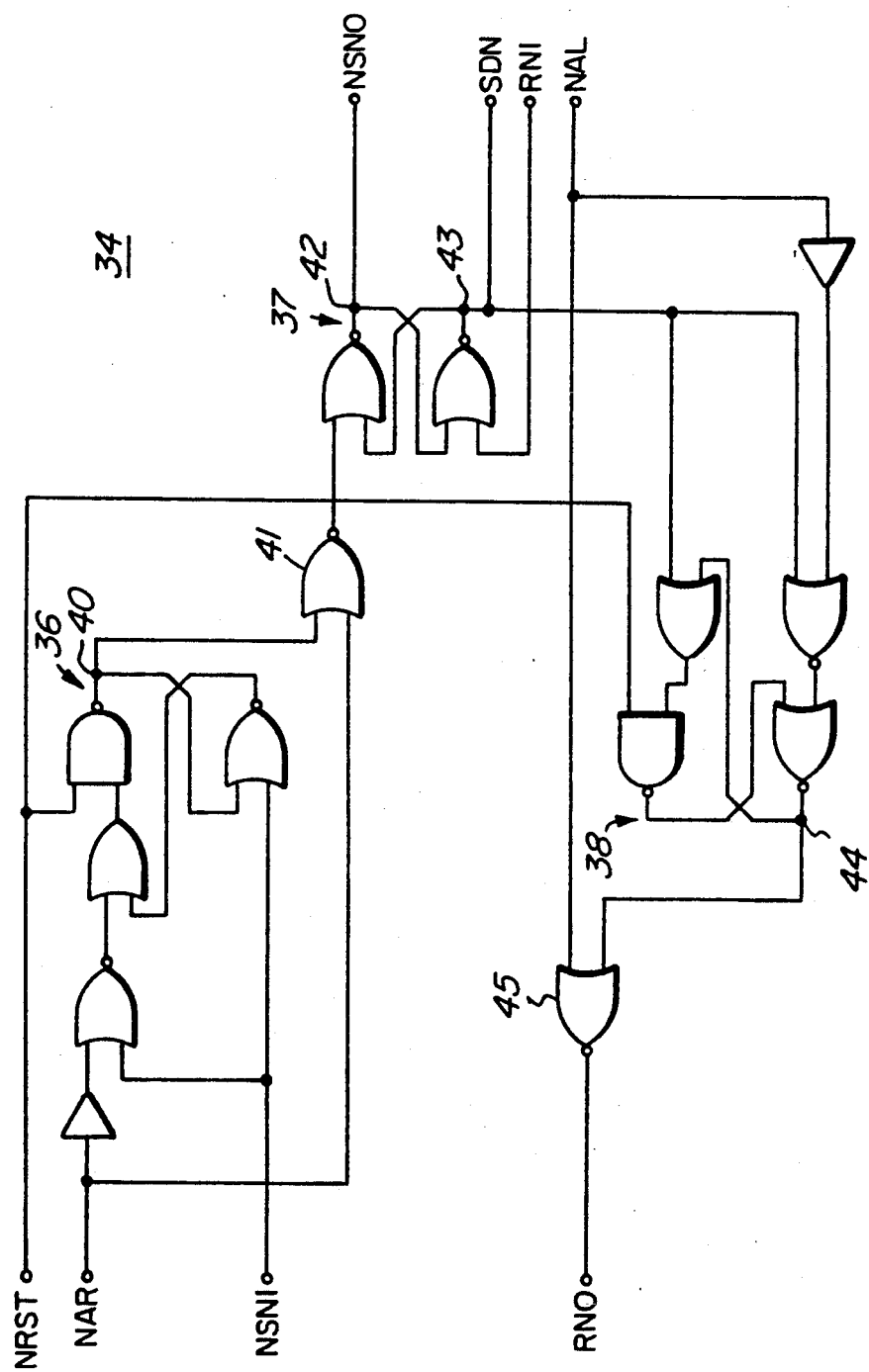
FIG. 7 shows the logic circuitry of one type of integrator block of FIG. 6.

The internal structure of the SLC3 block 34 is shown in FIG. 7. The SLC3 circuit consists of three SR flip-flops 36, 37 and 38 with associated logic circuitry. The flip-flop 37 is the phase error output stage, the flip-flop 36 controls shifting '1's right and the flip-flop 38 controls shifting '0's left. The NRST input to this block is an asynchronous reset. The output 40 of flip-flop 36 is connected to one input of a NOR gate 41 which has another input connected to NAR. The output of NOR gate 41 is connected to an input of flip-flop 37 and RNI is connected to another input of flip-flop 37. NSNO is connected to one output 42 of flip-flop 37 and SDN is connected to the other output 43 of flip-flop 37. Output 43 is also connected to an input of flip-flop 38 through logic gates and NAL is also connected to an input of flip-flop 38 through logic gating. The output 44 of flip-flop 38 is connected to an input of a NOR gate 45 another input of which is connected to NAL. The output of NOR gate 45 is connected to RNO.

Figure 8:
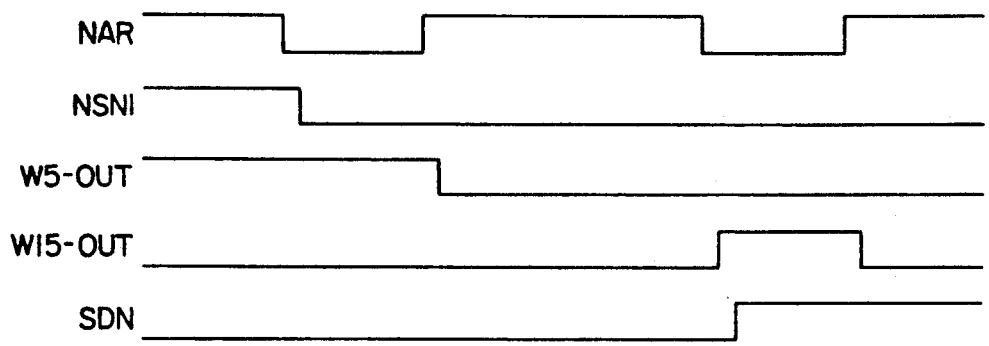
FIG. 8 shows waveforms to explain a shift right sequence of FIG. 7.

The shift right sequence performed by the circuit of FIG. 7 is explained as follows. The output 40 of flip-flop 36 is reset to '0' when the previous stage inverted phase error output connected to NSNI is reset to '0' and the NAR signal goes high. Since the output 40 is '0' then the next NAR '0' pulse results in a '1' pulse at the output of gate 41 causing the output 43 of flip-flop 37 and thus the SDN output to be set to '1'. The waveforms for a shift right sequence are shown in FIG. 8.

Figure 9:
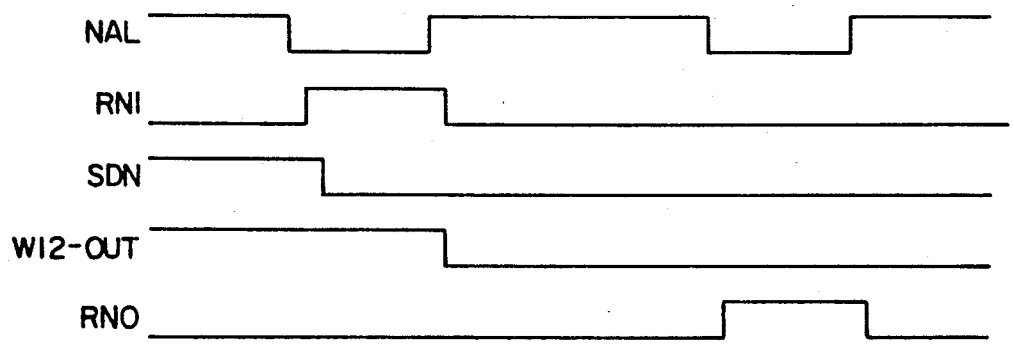
FIG. 9 shows waveforms to explain a shift left sequence of FIG. 7.

The shift left sequence is now described. The output 43 of flip-flop 37 and thus the phase error output signal SDN is reset to '0' when the RNI signal is pulsed high. The output 44 of flip-flop 38 is reset to '0' when the SDN signal is '0' and the NAL signal goes high. If the output 44 is '0' then the next NAL '0' pulse will result in a '1' pulse of the RNO output signal. The waveforms for a shift left sequence are shown in FIG. 9.

When the NRST, NAR and NAL inputs of the SLC3 block 34 are reset to '0' the flip-flops 36 and 38 are set (output 40='1', output 44='1'). The output of gate 41 is held at to '0' while the RNI signal is set to '1' resetting the flip-flop 37 (SDN='0'). The RNO output is set to '1'.

Figure 11:
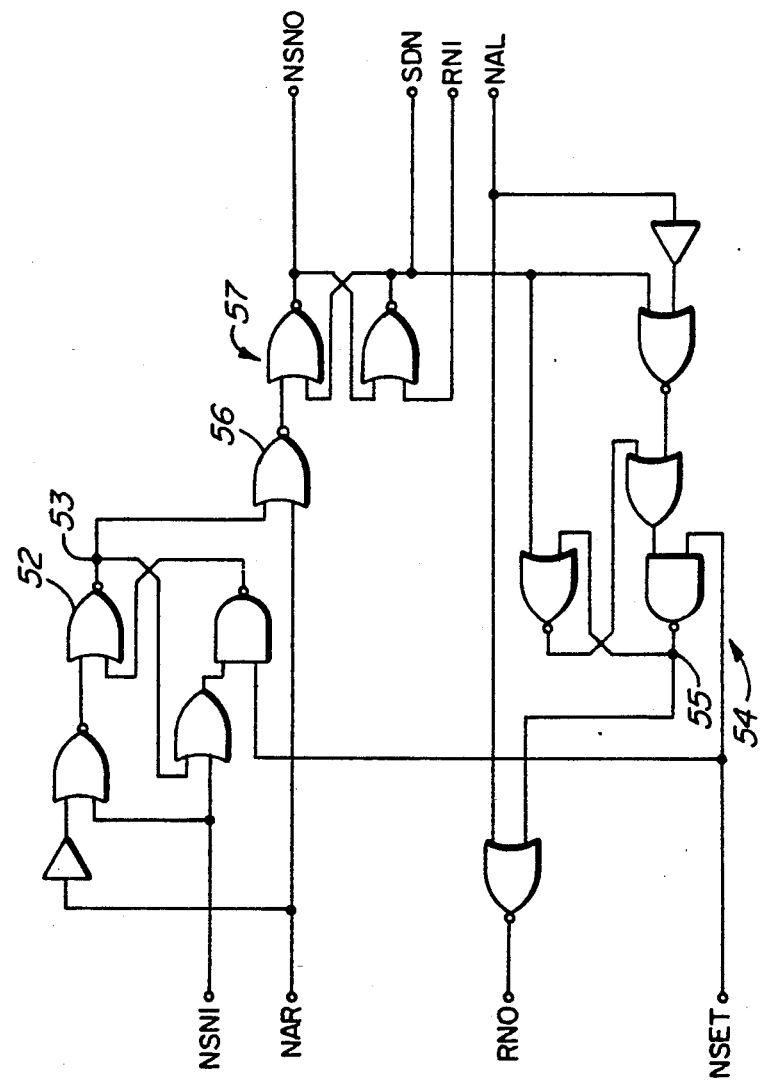
FIG. 11 shows the logic circuitry of another type of integrator block of FIG. 6.
Figure 12:
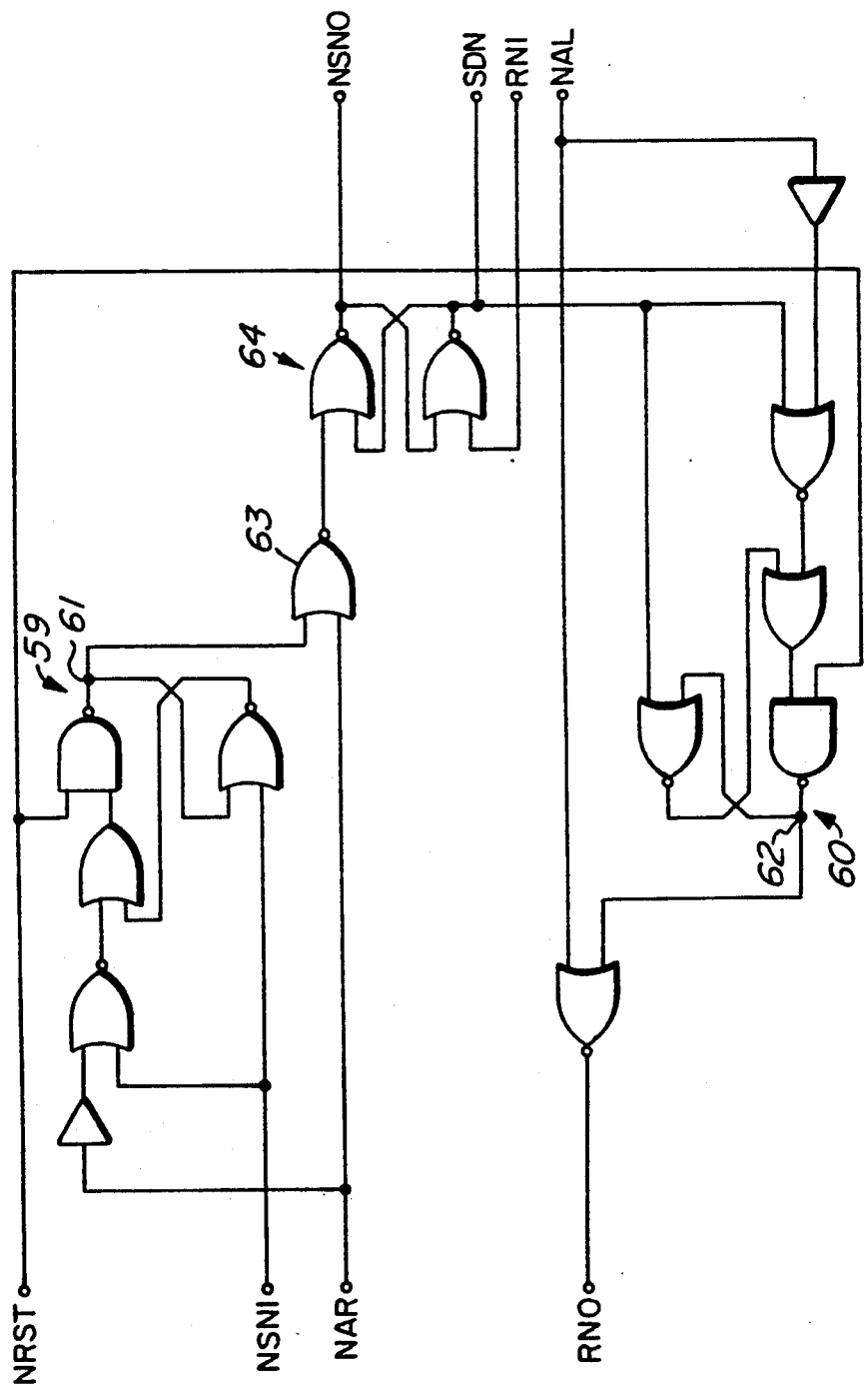
FIG. 12 shows the logic circuitry of yet another type of integrator block of FIG. 6.

The internal structures of the SLC1 and SLC2 blocks 32 and 33 are shown in FIG. 11 and FIG. 12, respectively. When the NRST input signal to the phase error integrator is reset to '0' the NRST input of the PDET block 20, the NRST input of the SLC2 block 33 and the NSET input of the SLC1 block 32 are reset to '0'. When the NRST signal is reset to '0' the NAR and NAL outputs of the PDET block are reset to '0'.

When the NRST, NAR and NAL: inputs of the SLC2 block 33 are reset to '0' the flip-flops 59 and 60 are set (output 61='1', output 42='1'). The output of gate 63 is held at to '0' while the RNI signal is set to '1' resetting the flip-flop 64 (SDN='0'). The RNO output is reset to '0'.

When the NRST signal of the phase error integrator is reset to '0' the SLC1 blocks 32 are set to '1' (SDN='1') and the SLC2,3 blocks 33 and 34 are reset to '0' (SDN='0'). This initializes the phase error integrator to equal '1111110000000' (ERR0-ERR13).

Figure 10:
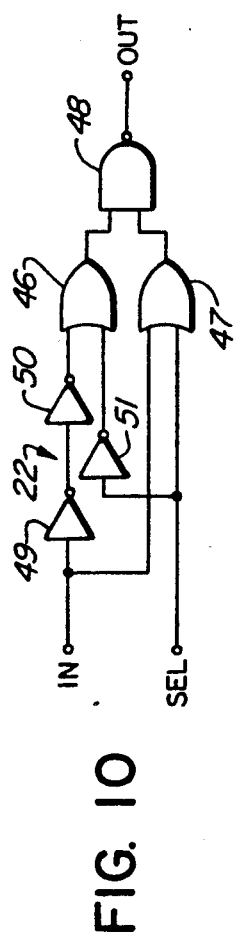
FIG. 10 shows the logic circuitry forming one of the delay elements of FIG. 3.

The clock data phasing circuit is self calibrating. This allows the use of gate delays as delay elements 22. A logical implementation of one of the delay elements 22 of FIG. 3 is shown in FIG. 10. Two EXOR gates 46 and 47 have outputs connected to a NAND gate 48 which provides the OUT terminal of the delay element. The inputs of gate 47 are connected respectively to IN and SEL inputs. One of the inputs of gate 46 is connected through inverters 49 and 50 to the IN input and the other input of gate 46 is connected through an inverter 51 to the SEL input. In this circuit the longest delay path is through gates 49, 50 and 48. This path is enabled when SEL equals '1'. The shortest delay path is directly through gate 48. This path is enabled when SEL equals '0'. Each delay element is inverting through both paths. This reduces pulse width distortion. The delay block has an even number of delay elements and is noninverting. An alternative method of path selection would use analog switches instead of a logical multiplexer.

Figure 13:
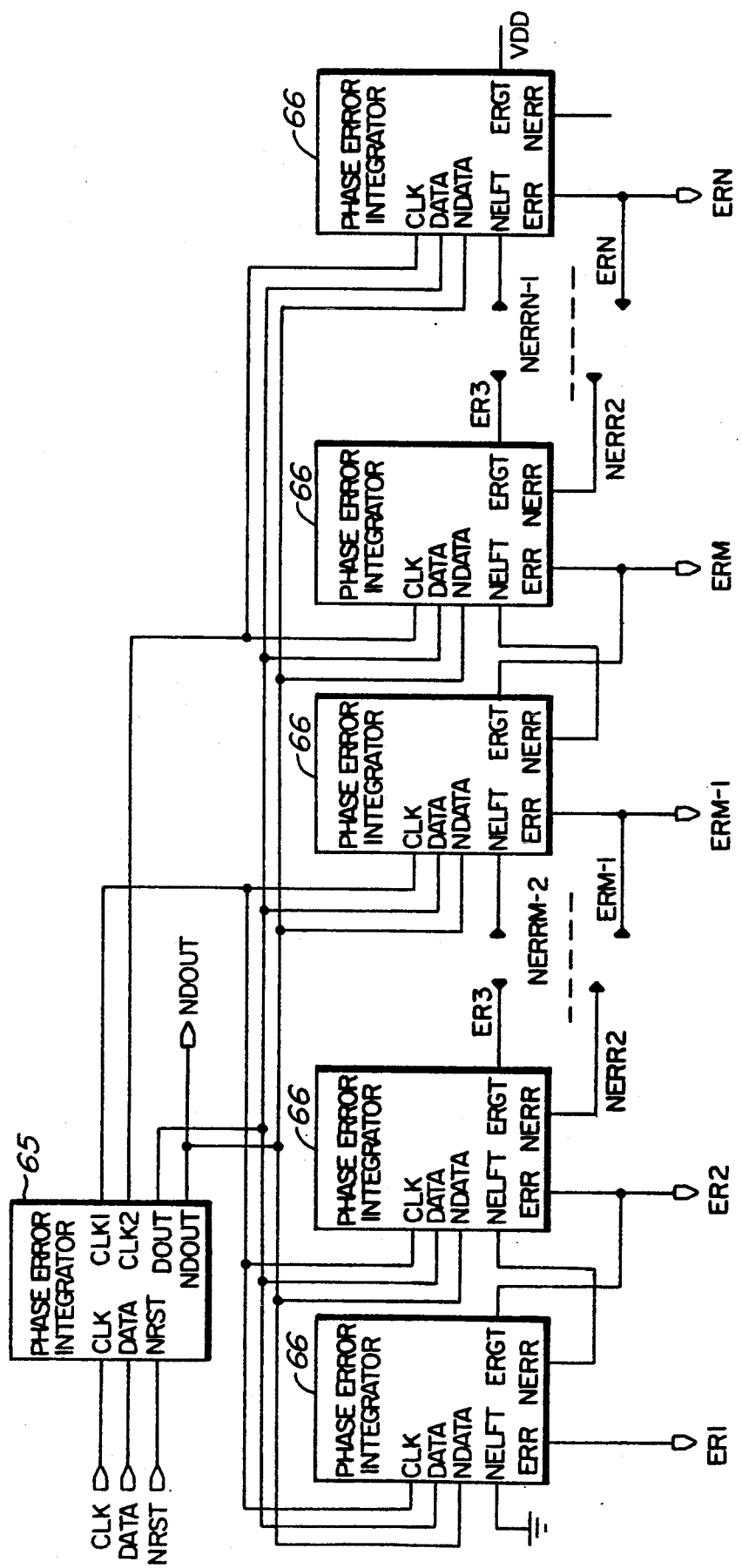
FIG. 13 is a block diagram showing an alternative type of phase error integrator.

Instead of the phase error integrator 11 being formed as two separate functional entities, namely a phase error detector and an integrating chain as shown in FIG. 2, the two functions of phase error detection and integration could be combined as per FIG. 13.

Referring to FIG. 13, the phase error integrator comprises fourteen identical segments 66. Each segment 66 has CLK, DATA and NRST inputs. The DATA inputs of segments 66 are all connected to DOUT of block 65 and the NDATA inputs are all connected to NDOUT of block 65. The CLK inputs of the first half of the segments 66 are all connected to CLK1 and the CLK inputs of the second half of the segments 66 are all connected to CLK2 of block 65. An ERR output provides a single digit of the integrated phase error ERR0 to ERR13. The inverted phase error output NERR of each block is connected to the NELFT input of the next block. The ERR output of each block is connected to the ERGHT input of the previous block.

Figure 14:
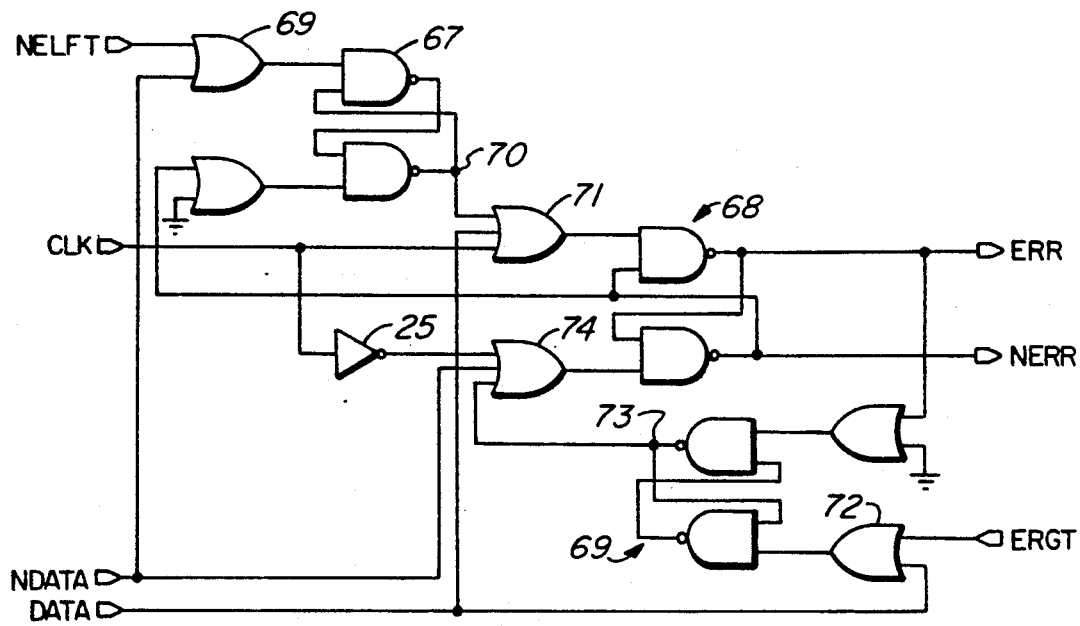
FIG. 14 shows the logic circuitry of one type of the phase error integrator block of FIG. 13.

Each segment 66 may be constructed as shown in FIG. 14. The circuit consists of three SR flip-flops 67, 68 and 69 with associated logic circuitry. The flip-flop 68 is the phase error output stage, the flip-flop 67 controls shifting '1's right and the flip-flop 68 controls shifting '0's left.

Figure 15:
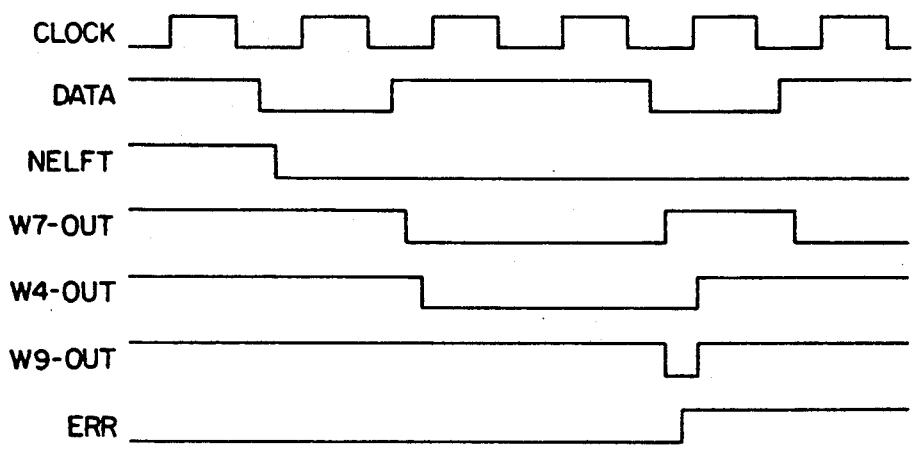
FIG. 15 shows waveform to explain a shift right sequence of FIG. 14.

The shift right sequence performed by the circuit of FIG. 14 is explained as follows. Assume that the previous block 66 has an ERR output of '1' and the current block 66 has an ERR output of '0'. In this case the NELFT input signal is '0'. When DATA goes to '1' the output of an OR gate 69, connected to an input on flip-flop 67, goes to '0' activating flip-flop 67 thereby switching the output 70 of flip-flop 67 to '0'. If the falling edge of DATA occurs while the CLK signal is '0' the output of an OR gate 71, which has inputs respectively connected to output 70, DATA and CLK, goes to '0' activating the flip-flop 68 thereby setting the ERR output of flip-flop 68 to '1' and the NERR output to '0'. The NERR signal goes to '0' and disables flip-flop 67 such that output 70 goes to '1'. The waveforms for a shift right sequence are shown in FIG. 15.

Figure 16:
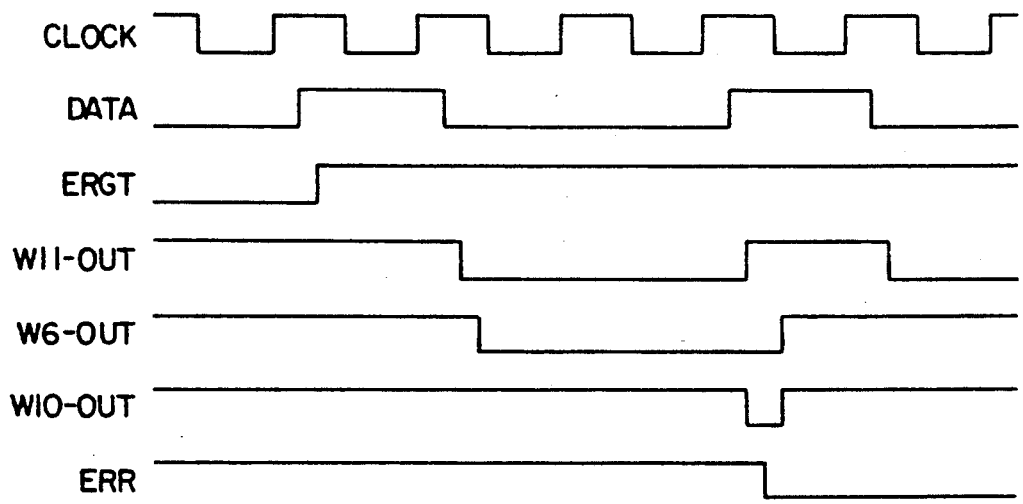
FIG. 16 shows waveform to explain a shift left sequence of FIG. 14.

The shift left sequence will now be described. Assume the ERR output of the next block 66 is '0' and the current block 66 has an ERR output of '1'. In this case the ERGT input signal is '0'. When DATA goes to '0' both inputs of an OR gate 72 are at '0'. This switches flip-flop 69 to provide a '0' at output 73. If the rising edge of DATA then occurs while the CLK signal is '1' the output of an OR gate 74 goes to '0' resetting flip-flop 68 such that ERR becomes '0' and NERR '1'. The ERR signal then disables flip-flop 69 such that output 73 goes to '1'. The waveforms for a shift left sequence are shown in FIG. 16.

Figure 17:
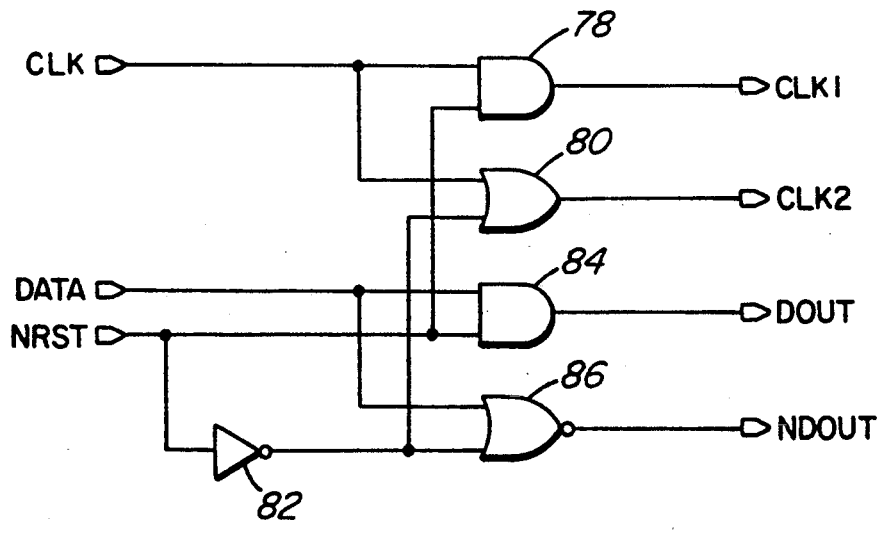
FIG. 17 shows the logic circuitry of another type of phase error integrator block of FIG. 13.

Reference should now be made to FIG. 17 in conjunction with FIG. 14 for an understanding of the reset function provided by reset control block 65. Reset control block 65 has a first AND gate 78 having a first input connected to the CLK input and a second input connected to the NRST input and having an output providing the CLK1. An OR gate 80 has a first input connected to the CLK input and a second input connected through an inverter 82 to the NRST input and has an output providing CLK2. An AND gate 84 has a first input connected to the DATA input and a second input connected to the NRST input and has an output providing DOUT. The block 65 is completed by a NOR gate 86 having a first input connected to the DATA input and a second input connected through the inverter 82 to the NRST input and having an output providing NDOUT.

The reset function is activated by a low pulse appearing at the NRST input. This causes DOUT and NDOUT top be held low. Additionally, the CLK1 is held low which resets the first half of segments 66 to '1' at the ERR output and CLK2 is held high which resets the ERR output of the second half of the segments 66 to '0'.

It should be noted that the circuit of FIG. 13 differs from that of FIG. 2 in that FIG. 13 uses signal transitions instead of pulses, does not require a separate PDET block and does not need to delay DATA in order to centre it with respect to the phase error.

We claim:

1. A phase error integrator for determining the phase error between an NRZ data signal and a clock signal frequency locked to the data signal comprising a data input and a clock input, means for comparing the phase of said NRZ data signal applied to the data input with said clock signal applied to the clock input and deriving at N outputs a digital phase error output signal which at any point in time comprises a chain of N digits made up of M digits of a first binary sense (i.e. 1 or 0) followed by P digits of a second binary sense where M plus P equals N, the chain shifting the first binary sense digits right when the error between the data signal and the clock signal is in one sense (i.e. positive or negative) and the chain shifting the second binary sense digits left when the error is in the opposite sense.

2. A phase error integrator according to claim 1 in which the means for comparing is a phase error detector to which the data input and clock input are connected, the phase error detector providing one output signal when the phase error is in the one sense and another output signal when the phase error is in the opposite sense and the digital phase error output signal is derived at respective outputs of an integrating chain having N segments all of which are connected to receive the one output signal and the other output signal.

3. A phase error integrator according to claim 1 including a reset input to initialize the error output signal to M digits of the first binary sense and P digits of the second binary sense.

4. A phase error integrator according to claim 2 including a reset input connected both to the phase error detector and the integrating chain to initialize the error output signal to M digits of the first binary sense and P digits of the second binary sense.

5. A phase error integrator according to claim 4 in which the phase error detector comprises logic gates providing the one output signal at a first terminal and the other output signal at a second terminal, the first and second terminals being connected to respective input terminals of the integrating chain.

6. A phase error integrator according to claim 1 in which the means for comparing is functionally incorporated in a phase error integrating chain having N segments all of which are connected to the data and clock inputs, each segment having an output at which a respective digit of the digital phase error signal is obtained.

7. A phase error integrator according to claim 6 including a reset input connected to all the segments of the integrating chain to initialize the error output signal to M digits of the first binary sense and P digits of the second binary sense.

8. A phase alignment circuit for aligning a data signal with a clock signal to which it is frequency locked, comprising a phase error integrator and a delay block, the phase error integrator comprising a data input and a clock input, means for comparing the phase of said data signal applied to the data input with said clock signal applied to the clock input and deriving at N outputs a digital phase error output signal which at any point in time comprises a chain of N digits made up of M digits of a first binary sense (i.e. 1 or 0) followed by P digits of a second binary sense where M plus P equals N, the chain shifting the first binary sense digits right when the error between the data signal and the clock signal is in one sense (i.e. positive or negative) and the chain shifting the second binary sense digits left when the error is in the opposite sense, and the delay block having a plurality of inputs connected respectively to at least some of the N outputs of the phase error integrator, an input for receiving data and an output at which is provided a delayed data signal, the output being connected to the data input of the phase error integrator, the delay block delaying the data signal unit there is concordance between the phase of the clock and delayed data signals.

9. A phase alignment circuit according to claim 8 in which all of the N outputs of the phase error integrator except the first and last are connected to respective inputs of the delay block, the first and last outputs of the phase error integrator being connected to a circuit for determining overflow and underflow, said circuit for determining overflow and underflow being connected to a reset input of the phase error integrator to initialize the error output signal to M digits of the first binary sense and P digits of the second binary sense.

10. A phase alignment circuit according to claim 9 in which the phase error integrator provides a delayed data signal at an input which is connected to an input of a flip-flop to which the clock signal is fed whereby the data signal is reclocked.

* * * * *

UNITED STATES PATENT AND TRADEMARK OFFICE
CERTIFICATE OF CORRECTION

PATENT NO. : 5,148,113

DATED : September 15, 1992

INVENTOR(S) : Mark S. WIGHT et al.

It is certified that error appears in the above-identified patent and that said Letters Patent is hereby corrected as shown below:

Column 2, line 37, change "blcok" to --block--;

Column 8, line 22, change "unit" to --until--.

Signed and Sealed this

Fourth Day of January, 1994

*Attest:*

BRUCE LEHMAN

*Attesting Officer*     *Commissioner of Patents and Trademarks*